United States Patent
Al Bawab et al.

(10) Patent No.: US 11,348,574 B2
(45) Date of Patent: May 31, 2022

(54) MEETING-ADAPTED LANGUAGE MODEL FOR SPEECH RECOGNITION

(71) Applicant: Microsoft Technology Licensing, LLC, Redmond, WA (US)

(72) Inventors: Ziad Al Bawab, Foster City, CA (US); Anand U Desai, Sunnyvale, CA (US); Shuangyu Chang, Davis, CA (US); Amit K Agarwal, Redmond, WA (US); Zoltan Romocsa, Kenmore, WA (US); Christopher H Basoglu, Everett, WA (US); Nathan E Wohlgemuth, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 16/531,435

(22) Filed: Aug. 5, 2019

(65) Prior Publication Data
US 2020/0349931 A1     Nov. 5, 2020

Related U.S. Application Data

(60) Provisional application No. 62/843,481, filed on May 5, 2019.

(51) Int. Cl.
| | |
|---|---|
| *G10L 15/193* | (2013.01) |
| *G06Q 10/10* | (2012.01) |
| *G10L 15/197* | (2013.01) |
| *G10L 15/22* | (2006.01) |
| *G10L 15/30* | (2013.01) |

(52) U.S. Cl.
CPC .......... *G10L 15/193* (2013.01); *G06Q 10/107* (2013.01); *G06Q 10/1095* (2013.01); *G10L 15/197* (2013.01); *G10L 15/22* (2013.01); *G10L 15/30* (2013.01)

(58) Field of Classification Search
USPC ....................................... 704/1–504
See application file for complete search history.

(56) References Cited

U.S. PATENT DOCUMENTS

| | | | |
|---|---|---|---|
| 9,934,775 B2 * | 4/2018 | Raitio ...................... G10L 13/10 |
| 9,972,304 B2 * | 5/2018 | Paulik ...................... G10L 15/30 |
| 10,217,457 B2 | 2/2019 | Gilbert et al. |

(Continued)

FOREIGN PATENT DOCUMENTS

WO     2016126767 A1     8/2016

OTHER PUBLICATIONS

"International Search Report and Written Opinion Issued in PCT Application No. PCT/US20/024532", dated Jul. 6, 2020, 11 Pages.

(Continued)

*Primary Examiner* — Marcus T Riley
(74) *Attorney, Agent, or Firm* — Buckley, Maschoff & Talwalkar LLC

(57) ABSTRACT

A system includes acquisition of meeting data associated with a meeting, determination of a plurality of meeting participants based on the acquired meeting data, acquisition of e-mail data associated with each of the plurality of meeting participants, generation of a meeting language model based on the acquired e-mail data and the meeting data, and transcription of audio associated with the meeting based on the meeting language model.

15 Claims, 8 Drawing Sheets

(56) References Cited

U.S. PATENT DOCUMENTS

| | | | |
|---|---|---|---|
| 10,388,272 B1* | 8/2019 | Thomson | G10L 15/063 |
| 10,573,312 B1* | 2/2020 | Thomson | G10L 15/26 |
| 10,672,383 B1* | 6/2020 | Thomson | G10L 15/183 |
| 10,867,610 B2* | 12/2020 | Diamant | H04N 7/15 |
| 10,971,153 B2* | 4/2021 | Thomson | G10L 15/26 |
| 11,017,778 B1* | 5/2021 | Thomson | G10L 15/22 |
| 11,145,312 B2* | 10/2021 | Thomson | G10L 15/26 |
| 2004/0021765 A1* | 2/2004 | Kubala | H04N 7/15 |
| | | | 348/14.08 |
| 2004/0243393 A1* | 12/2004 | Wang | G10L 15/22 |
| | | | 704/9 |
| 2009/0099845 A1 | 4/2009 | George | |
| 2010/0268534 A1* | 10/2010 | Kishan Thambiratnam | |
| | | | G10L 15/26 |
| | | | 704/235 |
| 2013/0144603 A1 | 6/2013 | Lord et al. | |
| 2014/0222426 A1 | 8/2014 | Di Fabbrizio et al. | |
| 2015/0106091 A1* | 4/2015 | Wetjen | H04M 3/568 |
| | | | 704/235 |
| 2015/0336578 A1* | 11/2015 | Lord | B60T 7/22 |
| | | | 701/2 |
| 2015/0348547 A1 | 12/2015 | Paulik et al. | |
| 2016/0093300 A1 | 3/2016 | Begeja et al. | |
| 2016/0171973 A1 | 6/2016 | Nissan et al. | |
| 2016/0379626 A1 | 12/2016 | Deisher et al. | |
| 2018/0374484 A1 | 12/2018 | Huang et al. | |
| 2019/0341050 A1* | 11/2019 | Diamant | H04N 7/155 |
| 2020/0175961 A1* | 6/2020 | Thomson | G06F 21/6245 |
| 2020/0175962 A1* | 6/2020 | Thomson | G10L 15/183 |
| 2020/0175987 A1* | 6/2020 | Thomson | G10L 15/187 |
| 2020/0243094 A1* | 7/2020 | Thomson | G10L 15/22 |
| 2020/0349930 A1* | 11/2020 | Al Bawab | G06Q 10/1095 |
| 2020/0349931 A1* | 11/2020 | Al Bawab | G06F 40/211 |
| 2021/0233530 A1* | 7/2021 | Thomson | G10L 15/30 |

OTHER PUBLICATIONS

"International Search Report and Written Opinion Issued in PCT Application No. PCT/US20/025092", dated Jul. 29, 2020, 13 Pages.

"Non Final Office Action Issued in U.S. Appl. No. 16/665,574", dated Aug. 13, 2021, 21 Pages.

* cited by examiner

MEETING-ADAPTED LANGUAGE MODEL FOR SPEECH RECOGNITION

CROSS-REFERENCE TO RELATED APPLICATIONS

The present application claims priority to U.S. Provisional Patent Application No. 62/843,481, filed May 5, 2019, the contents of which are incorporated herein by reference for all purposes.

BACKGROUND

Computer-implemented transcription is becoming increasingly accurate. This accuracy suffers in the case of meeting audio. For example, meeting participants may use technical terms and meeting-specific jargon which are not easily recognized by generic language models. The use of meeting-specific language models which include such terms may improve the accuracy of meeting transcriptions. However, generation and usage of meeting-specific language models presents several difficulties.

For instance, generation of a meeting-specific language model requires the identification and collection of data relevant to a meeting. The generation of language models also consumes significant time and resources, as it requires at least accessing identified data sources, downloading the data that will be included in the adapted language model, and building the actual model. Yet another challenge is the requirement of data freshness. The use of old, stale data in an adapted language model reduces the potential benefit of such a model on meeting transcription accuracy. Moreover, the process of collecting data for language model adaptation and generating language models should be secure.

Systems for efficiently generating meeting-adapted language models are desired.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments improve speech recognition accuracy in meeting transcription tasks by automatically generating and using language models that have been adapted for a particular meeting. Some embodiments operate to identify multiple sources of meeting-related data that can be used to generate such adapted meeting-specific language models. Pre-processing is employed in some embodiments to ensure timely generation and availability of the models.

Some embodiments may utilize a single-provider, cloud-based e-mail, calendaring and document storage system (e.g., Microsoft O365) to identify and acquire meeting-related data. For example, some embodiments may utilize one or more of the following data sources for generating meeting-relevant adaptive language models: e-mails sent by each meeting participant; the full name of the meeting organizer and every meeting participant; the subject and the meeting body (description) from the meeting calendar item; and the content of any documents attached to the meeting calendar item. Other non-exhaustive examples of data sources include the names of people with whom meeting participants most often collaborate, documents generated by meeting participants, and chat sessions that include meeting participants.

Figure 1:
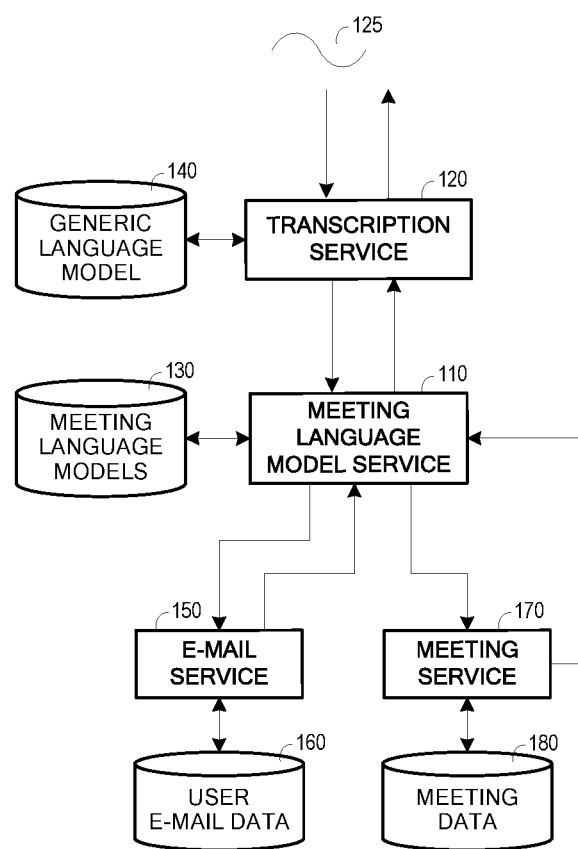
FIG. 1 is a block diagram of a system to generate a meeting-adapted language model according to some embodiments.

FIG. 1 illustrates a system to generate and utilize meeting-adapted language models according to some embodiments. Each illustrated component may be implemented by one or more computing systems, including distributed storage and/or distributed processing nodes. According to some embodiments, one or more of the components may be implemented by one or more virtual machines provisioned in an ad-hoc manner in a cloud-based architecture.

Generally, meeting language model service 110 provides transcription service 120 with a meeting language model from among meeting language models 130. Transcription service 120 adapts a generic language model 140 using the meeting language model to generate a meeting-adapted language model. Transcription service 120 receives audio 125 of an associated meeting and transcribes the meeting using the meeting-adapted language model.

In order to generate the meeting language model, meeting language model service 110 communicates with meeting service 170 to receive meeting information for a particular meeting from meeting data 180. Meeting service 170 may comprise any suitable meeting/calendaring service. The meeting information received from meeting service 170 may include a meeting calendar item associated with the particular meeting to be transcribed. Such a calendar item may include names of the meeting organizer and every meeting participant, the meeting subject, the meeting description, and the content of any documents associated with the meeting. The meeting information may also include names of people with whom meeting participants most often collaborate, documents generated by meeting participants, chat sessions that include meeting participants. and any other meeting- or meeting participant-related information.

Based on the list of meeting participants received from meeting service 170, meeting language model service 110 may communicate with e-mail service 150 to receive e-mail data associated with each meeting participant from user e-mail data 160. E-mail service 150 may comprise any suitable system providing an e-mail service. A single service may provide meeting and e-mail services in some embodiments.

Meeting language model service 110 generates a meeting language model based on the received meeting information and the received e-mail information. Meeting language model service 110 may store the meeting language model in meeting language models 130 in associated with an identifier of the meeting. Accordingly, transcription service 120 may receive an instruction to provide transcription services for a particular meeting, and may then use an identifier of the particular meeting to retrieve an associated meeting language model from meeting language models 130. As mentioned above, transcription service 120 adapts a base, or generic, language model 140 using the retrieved meeting language model to generate a meeting-adapted language model, and transcribes audio of the particular meeting using the meeting-adapted language model.

Figure 2:
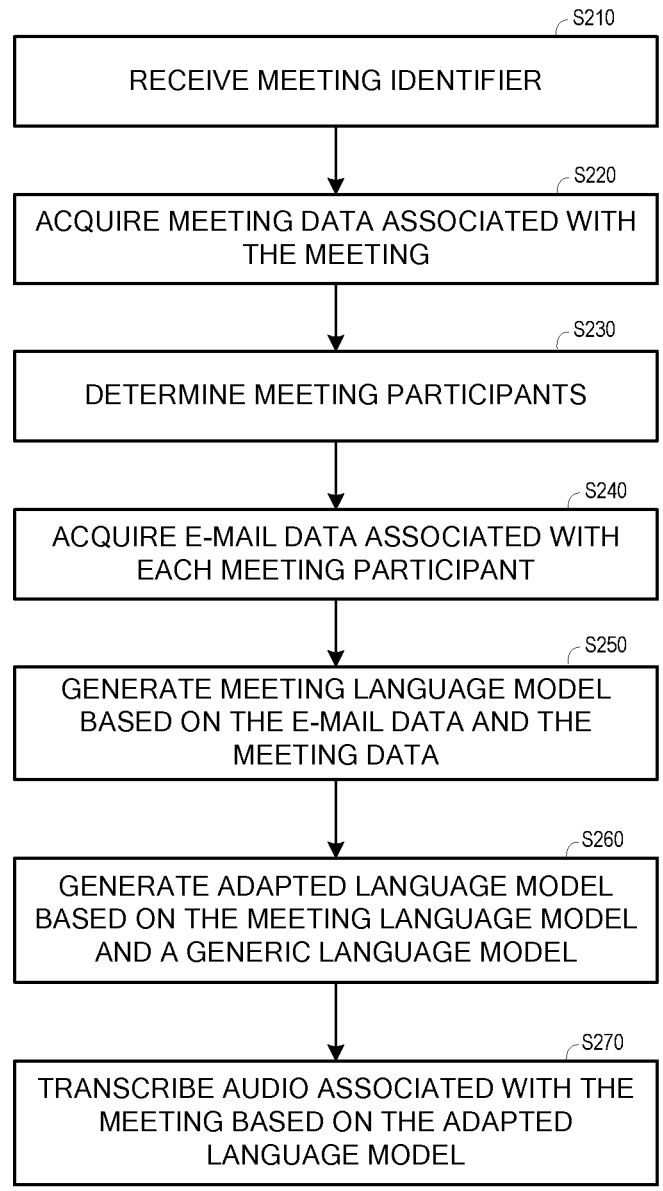
FIG. 2 is a flow diagram to generate a meeting-adapted language model according to some embodiments.

FIG. 2 is a flow diagram of a process to generate and utilize a meeting-adapted language model according to some embodiments. The FIG. 2 process and the other processes described herein may be performed using any suitable combination of hardware and software. The system of FIG. 1 may implement the FIG. 2 process in some embodiments. Software program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Embodiments are not limited to the examples described below.

Initially, at S210, meeting language model service 110 receives an identifier of a meeting for which a meeting language model is to be generated. The meeting identifier may be received from meeting service 170 upon creation of a meeting within meeting data 180, from an administrator, from a meeting organizer, or from any other suitable source. Other scenarios in which a meeting identifier may be received are described below with respect to FIGS. 3 and 4.

Meeting data associated with the meeting is acquired at S220. According to some embodiments, service 110 queries meeting service 170 for the meeting data using the meeting identifier. Such a query may be submitted to service 170 over a secure channel using token-based authentication or the like. Meeting service 170 then acquires the meeting data from meeting data 180 based on the meeting identifier and returns the meeting data to meeting language model service 110.

The retrieved meeting data may include a meeting calendar item which in turn includes names of the meeting participants and their meeting roles, the meeting subject, the meeting description, and the content of any documents associated with the meeting. The meeting data may also include names of people with whom meeting participants most often collaborate, documents generated by meeting participants, chat sessions that include meeting participants. and any other meeting- or meeting participant-related information.

Meeting participants are determined at S230. According to some embodiments, the meeting participants are determined from the meeting data acquired at S220. Next, at S240, e-mail data associated with each meeting participant is acquired. In some embodiments, meeting language model service 110 communicates with e-mail service 150 to retrieve this e-mail data from user e-mail data 160. Due to the sensitivity of e-mail data, such retrieval may also require authentication and authorization of meeting language model service 110.

The retrieved e-mail data may comprise actual e-mails with or without attachments, or other data representative of the e-mails as described below. The retrieved e-mail data may encompass a particular time period (e.g., previous 6 months), and may, in some embodiments, include documents associated with (e.g., created by) the meeting participants. The particular volume and/or type of e-mails retrieved may depend upon the role of each meeting participant in the meeting (e.g., organizer, required, optional).

A meeting language model is generated at S250 based on the received meeting data and the received e-mail data. Any suitable techniques for building a language model from text data and language model formats may be employed at S250. More-specific implementations will be described below. Meeting language model service 110 may store the generated meeting language model in meeting language models 130, in associated with the received meeting identifier.

At S260, an adapted language model is generated based on the meeting language model and a generic language model. The adapted language model may be generated by meeting language model service 110 or by another entity. Generation of the adapted language model at S260 may occur at any time prior to meeting transcription. Some embodiments may generate the adapted language model once the meeting language model is generated. In some embodiments, the meeting language model is retrieved and used to generate the adapted language model shortly before the meeting. According to some embodiments, the adapted language model is generated on-the-fly during transcription using the meeting language model and the generic language model.

Audio associated with the meeting is transcribed using the adapted language model at S270. For example, transcription service 120 may receive an instruction to provide transcription services for a particular meeting, and may then use an identifier of the particular meeting to retrieve an associated meeting language model from meeting language models 130. As mentioned above, transcription service 120 may then adapt a generic language model 140 using the retrieved meeting language model to generate a meeting-adapted language model, and transcribe audio of the particular meeting using the meeting-adapted language model.

Since the data used to generate an adapted language model often includes sensitive customer data, some embodiments include features to support security and compliance rules and regulations. Some embodiments do not store sensitive data on storage disks. For example, preparation of adapted language models and the use of the models by a transcription service may be performed completely in memory. Embodiments may also run in a compliant "eyes-off" environment which prohibits user access to and viewing of the adapted language models.

Figure 3:
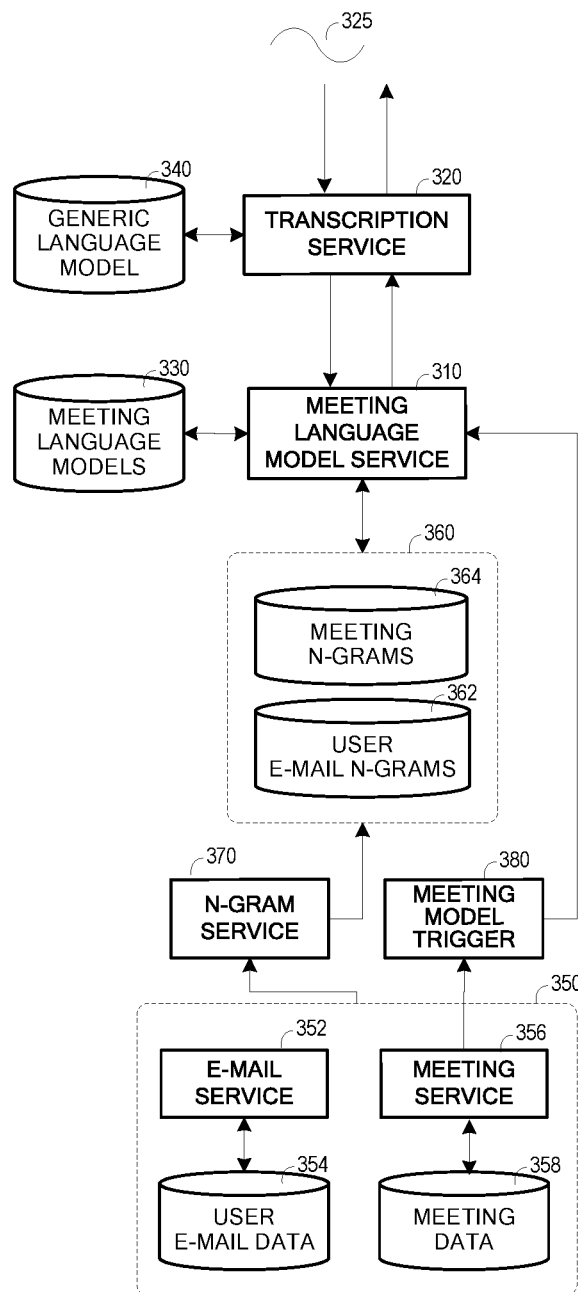
FIG. 3 is a block diagram of a system to generate a meeting-adapted language model according to some embodiments.

FIG. 3 illustrates a system to generate and utilize meeting-adapted language models according to some embodiments. The system of FIG. 3 may comprise a specific implementation of the system of FIG. 1, but embodiments are not limited thereto.

Meeting language model service 310 provides transcription service 320 with a meeting language model from among meeting language models 330. Transcription service 320 adapts a generic language model 340 using the meeting language model to generate a meeting-adapted language model. Transcription service 320 then receives audio 325 of an associated meeting and transcribes the meeting using the meeting-adapted language model.

According to the FIG. 3 system, meeting language model service 310 generates meeting language nodels 330 based on n-grams 360. n-grams 360 include user e-mail n-grams 362 and meeting n-grams 364. An n-gram as referred to herein is a model which assigns probabilities to the sequences of words. An n-gram model may be used to predict the occurrence of a word based on the occurrence of a previous n-1 words.

n-gram service 370 may, periodically or on-demand, communicate with e-mail service 352 to retrieve e-mail data 354 of various users (e.g., those users who are registered for transcription and/or eligible to participate in teleconferences). In some embodiments, n-gram service 370 also retrieves documents associated with the various users. n-gram service 370 may generate n-gram models for each of such users based on the retrieved data using any system for generating n-gram models which is or becomes known. These n-gram models may be stored among user e-mail n-grams 362 in association with identifiers of corresponding users for later on-demand retrieval by meeting language model service 310. According to some embodiments, n-gram service 370 periodically updates n-gram models associated with various users based on new user e-mail data retrieved from e-mail service 352.

n-gram service 370 may also, periodically or on-demand, communicate with meeting service 356 to retrieve meeting data 358 associated with various meetings defined within meeting data 358. As described above, the meeting data 358 may include names of the meeting participants and their meeting roles, the meeting subject, the meeting description, the content of any documents associated with the meeting, names of people with whom meeting participants most often collaborate, documents generated by meeting participants, chat sessions that include meeting participants. and any other meeting- or meeting participant-related information. n-gram service 370 may generate n-gram models for the various meetings using any system for generating n-gram models which is or becomes known. These meeting n-gram models may be stored among meeting n-grams 364 in association with identifiers of the corresponding meetings, such that the models may be retrieved on-demand by meeting language model service 310.

According to some embodiments, meeting model trigger 380 communicates with meeting service 356 to identify upcoming meetings. If a meeting is identified which is scheduled to begin within a certain threshold time (e.g., 10 minutes from the present time), meeting model trigger 380 transmits a message to meeting language model service 310 to begin generation of a meeting language model corresponding to the meeting. As a result, the meeting language adapted model is ready for use at the commencement of the meeting.

Meeting language model service 310 generates a meeting language model based on meeting n-grams 364 and user e-mail n-grams 362. In some embodiments, meeting language model service 310 uses meeting data 358 of a meeting to identify individual email n-grams 362 which correspond to the meeting participants, and to identify a meeting n-gram 364 which corresponds to the meeting. The identified n-grams are merged into a single set of n-grams using any suitable techniques which are or become known. Next, an ARPA language model is built from the merged n-gram model using any suitable technique which are or become known.

Figure 4:
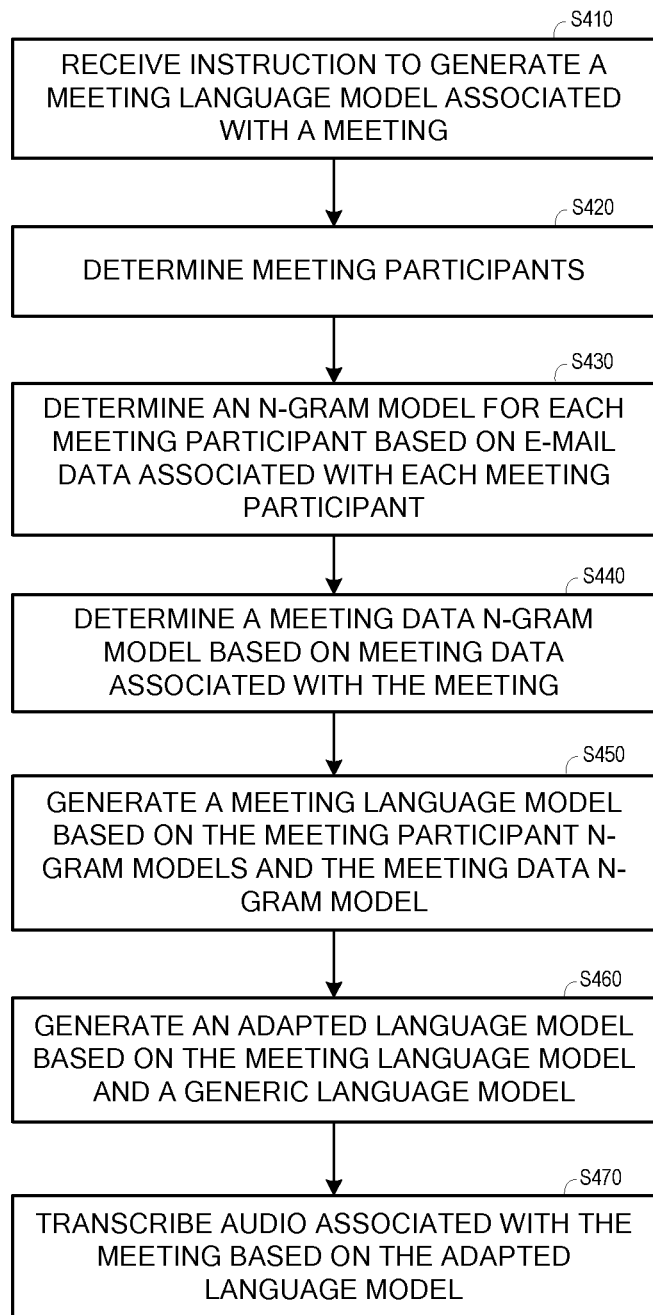
FIG. 4 is a flow diagram to generate a meeting-adapted language model according to some embodiments.

FIG. 4 is a flow diagram of a process to generate and utilize a meeting-adapted language model according to some embodiments. Embodiments are not limited to the examples described below.

At S410, a meeting language model service receives an instruction to generate a meeting language model associated with a meeting. As described above, such an instruction may be received from a service such as meeting model trigger 380, which monitors a meeting data store (e.g., meeting data 358) for upcoming meetings. The received instruction may include a meeting identifier which references a meeting whose data is stored in the data store.

Meeting participants are determined at S420. According to some embodiments, the meeting participants are determined by acquiring the meeting data stored in the data store using the identifier. In some embodiments, meeting language model service 310 queries meeting service 356 for the meeting data using the meeting identifier. Such a query may be submitted to service 356 over a secure channel using token-based authentication or the like. Meeting service 356 then acquires the meeting data from meeting data 358 based on the meeting identifier and returns the meeting data to meeting language model service 310.

Next, at S430, an n-gram model is determined for each meeting participant based on e-mail data associated with each meeting participant. According to some embodiments, S430 comprises determining identifiers of the meeting participants from the meeting data and using the identifiers to retrieve participant e-mail n-grams from periodically-updated user e-mail n-grams data store 362. In other embodiments, a meeting language model service or other service generates the e-mail n-gram models of each meeting participant from e-mail data at S430 as described above with respect to n-gram service 370.

A meeting data n-gram model is determined based on meeting data associated with the meeting at S440. According to some embodiments, S440 comprises retrieving a meeting n-gram model from user meeting n-grams data store 364 using the meeting identifier. In some embodiments, a meeting language model service or other service generates the meeting n-gram model at S440 based on the meeting data as described above with respect to n-gram service 370.

A meeting language model is generated based on the meeting data n-gram model and the meeting participant n-gram models at S450. In some embodiments, the n-gram models are merged into a single n-gram model and an ARPA language model is built from the merged n-gram model using any suitable technique which are or become known.

An adapted language model is generated at S460 based on the meeting language model and a generic language model. The adapted language model may be generated by meeting language model service 310, by transcription service 320, or by another entity. In some embodiments, the adapted language model is generated once the meeting language model is generated. In some embodiments, the meeting language model is retrieved and used to generate the adapted language model shortly before the meeting. According to some embodiments, the adapted language model is generated on-the-fly during transcription using the meeting language model and the generic language model.

Audio associated with the meeting is transcribed using the adapted language model at S470. For example, transcription service 320 receives an instruction to provide transcription services for a particular meeting, and then uses an identifier of the meeting to retrieve an associated meeting language model from meeting language models 330. As mentioned above, transcription service 320 may then adapt a generic language model 340 using the retrieved meeting language model to generate a meeting-adapted language model, and transcribe audio of the particular meeting using the meeting-adapted language model.

Figure 5:
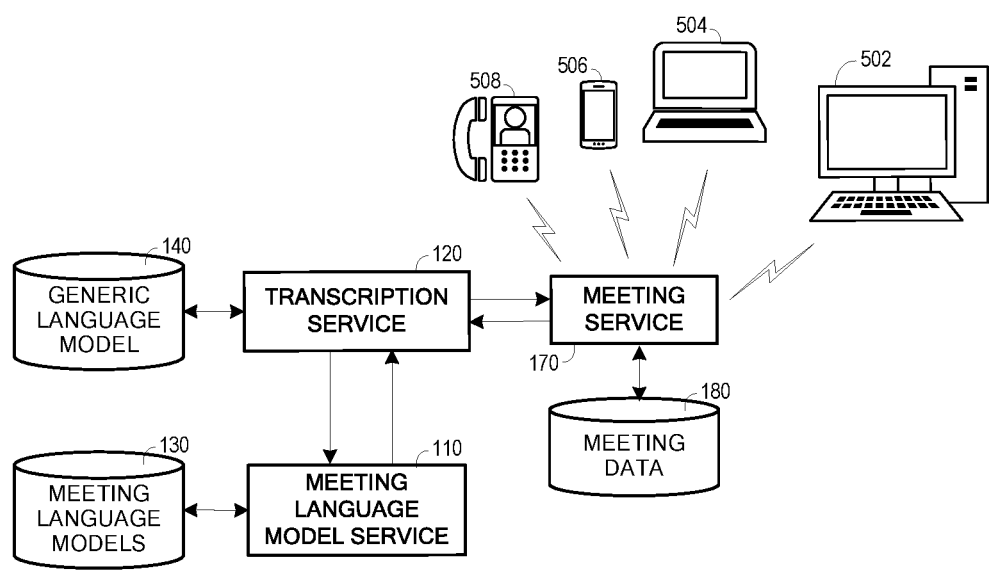
FIG. 5 is a block diagram of a system to utilize a meeting-adapted language model for meeting transcription according to some embodiments.

FIG. 5 illustrates a system for describing operation during a meeting according to some embodiments. The FIG. 5 system includes elements of FIG. 1 for purposes of example; these elements may be substituted for similarly-named elements of the FIG. 3 system.

It will be assumed that a meeting has been created and defined in data of meeting data 180. The data of the meeting may be associated with a meeting identifier in meeting data 180. The data of the meeting may include connection and authentication information.

Figure 6:
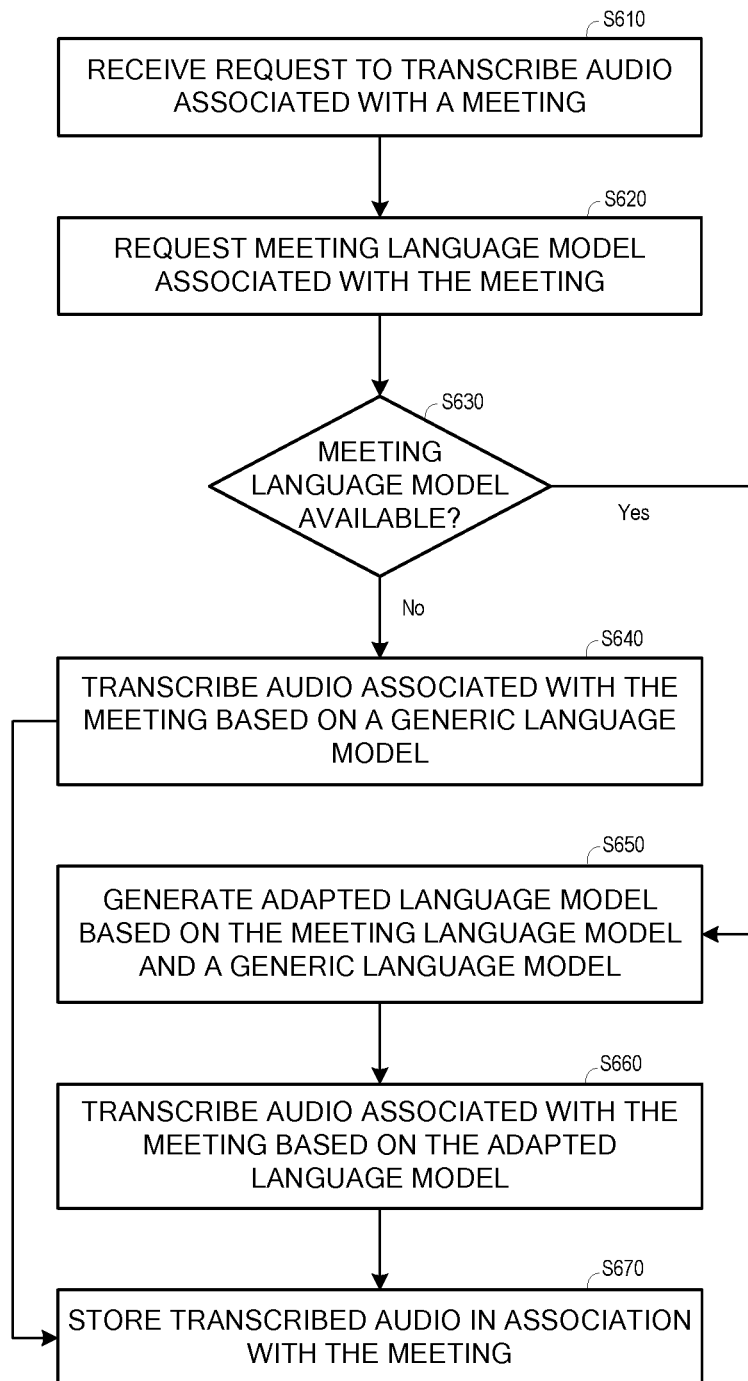
FIG. 6 is a flow diagram to utilize a meeting-adapted language model for meeting transcription according to some embodiments.

On or around a designated meeting start time, meeting participants operate respective client devices 502-508 to communicate with meeting service 170 and join the meeting. In response, meeting service 170 may pass the meeting identifier to transcription service 120 and request transcription of audio associated with the meeting. Transcription service 120 may proceed to execute a process such as that shown in FIG. 6.

Specifically, after receipt of the request at S610, transcription service 120 may request a meeting language model associated with the meeting. With respect to the FIG. 5 example, transcription service 120 may pass an identifier of the meeting to meeting language model service 110 along with a request for a corresponding meeting language model. If it is determined at S630 that no corresponding meeting language model is available (e.g., meeting language model service 110 returns an error or other negative response), transcription service 120 transcribes audio received from meeting service 170 at S640 using a generic language model 140.

Flow proceeds to S650 if meeting language model service 110 returns a meeting language model corresponding to the meeting. The returned meeting language model may be generated using any of the techniques described herein. At 5650, transcription service 120 generates an adapted language model based on the returned meeting language model and the generic language model. Transcription service 120 transcribes audio received from meeting service 170 using the adpated language model at S660.

Finally, transcribed audio is stored at S670 in association with the meeting. The transcribed audio is stored at S670 regardless of whether the generic language model or the adapted language model was used to transcribe the meeting audio. In some embodiments of S670, transcription service 120 transmits a file including text of the audio to meeting service 170. Meeting service 170 may store the file in association with the meeting identifier within meeting data 180. The stored file may then be accessed by the meeting organizer, meeting participants, and/or any other set of users to whom access is granted.

According to some embodiments, more than one meeting language model may be applicable to a meeting. The applicable meeting language models may be associated with various degrees of specificity to the meeting. For example, meeting language models 130 may include a meeting language model generated based only on the meeting data and not based on participant e-mail data, or a meeting language model based on meeting data of one or more previous meetings including the same meeting participants. Meeting language model service 110 one or more of such applicable models to provide to transcription service 130 at S630 in some embodiments. If more than one model is provided, transcription service 130 may combine these models using offline and online interpolation techniques, associating higher weights to the more specific and thus more relevant models. If transient failures occur during the use of the combined model, transcription service 130 may fall back to a less specific model or to the generic model.

Figure 7:
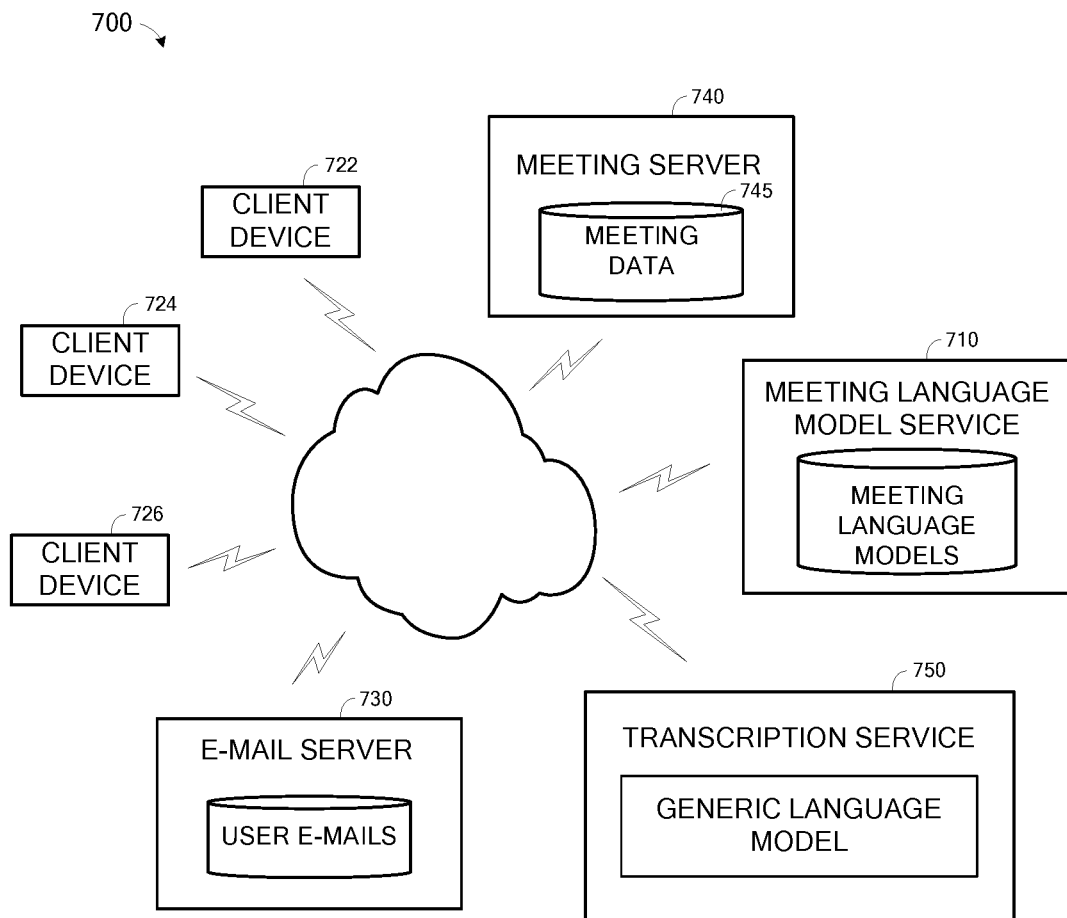
FIG. 7 is a block diagram of a cloud-based architecture providing transcription based on meeting-adapted language models according to some embodiments.

FIG. 7 illustrates distributed system 700 according to some embodiments. System 700 may be cloud-based and components thereof may be implemented using on-demand virtual machines, virtual servers and cloud storage instances. As shown, meeting language model service 710 may be implemented as a cloud service providing meeting language models to other services such as transcription service 750.

Meeting participants operate respective client devices 722-726 to communicate with meeting server 740 and join a meeting defined within meeting data 745. In response, meeting server 740 requests transcription of the meeting audio from transcription service 750 and includes an identifier of the meeting in the request. Transcription service 720 may pass the identifier to meeting language model service 710 to request a corresponding meeting language model.

Meeting language model service 710 returns a meeting language model corresponding to the meeting. The returned meeting language model may be previously-generated based on the meeting data associated with the meeting and on user e-mail data associated with the meeting participants and retrieved from e-mail server 730, as described herein. Transcription service 750 generates an adapted language model based on the returned meeting language model and a generic language model. During the meeting, transcription service 750 receives audio from meeting server 740 and transcribes the audio using the adapted language model. The transcribed audio may be stored in meeting data 745 in association with the meeting.

Figure 8:
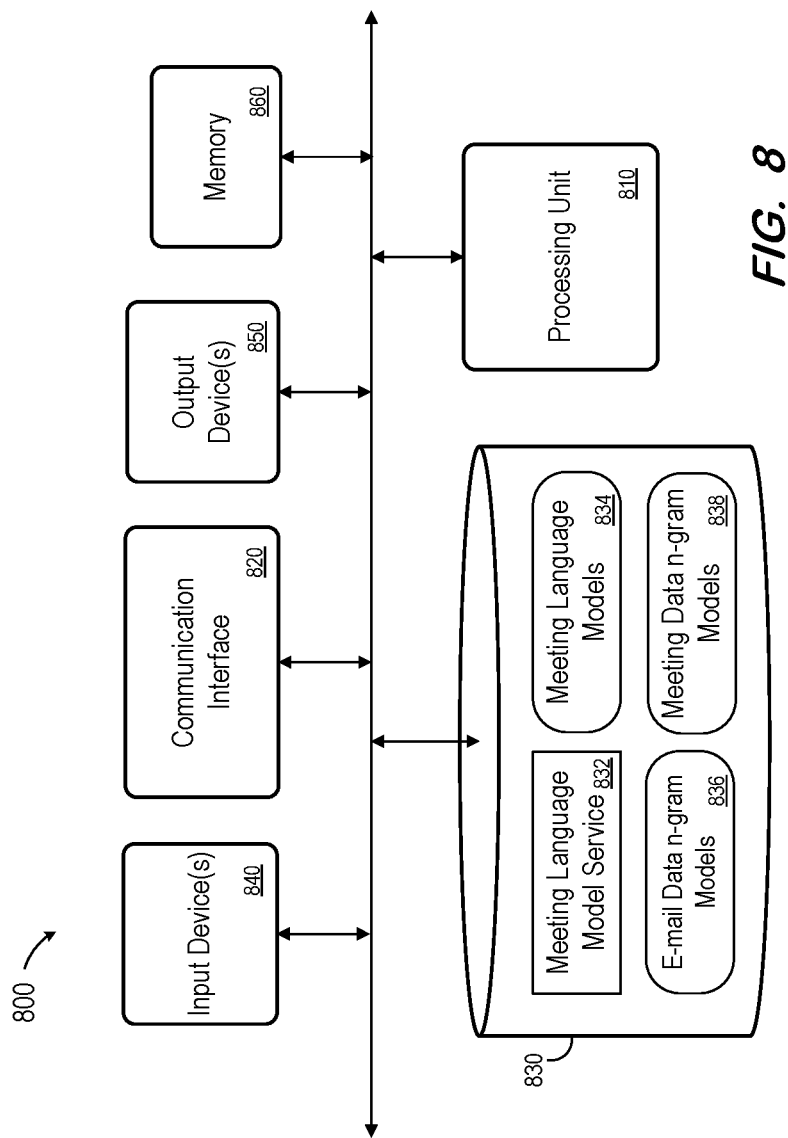
FIG. 8 is a block diagram of a computing system according to some embodiments.

FIG. 8 is a block diagram of system 800 according to some embodiments. System 800 may comprise a general-purpose server computer and may execute program code to provide meeting language models as described herein. System 800 may be implemented by a cloud-based virtual server according to some embodiments.

System 800 includes processing unit 810 operatively coupled to communication device 820, persistent data storage system 830, one or more input devices 840, one or more output devices 850 and volatile memory 860. Processing unit 810 may comprise one or more processors, processing cores, etc. for executing program code. Communication interface 820 may facilitate communication with external devices, such as client devices, and data providers as described herein. Input device(s) 840 may comprise, for example, a keyboard, a keypad, a mouse or other pointing device, a microphone, a touch screen, and/or an eye-tracking device. Output device(s) 850 may comprise, for example, a display (e.g., a display screen), a speaker, and/or a printer.

Data storage system 830 may comprise any number of appropriate persistent storage devices, including combinations of magnetic storage devices (e.g., magnetic tape, hard disk drives and flash memory), optical storage devices, Read Only Memory (ROM) devices, etc. Memory 860 may comprise Random Access Memory (RAM), Storage Class Memory (SCM) or any other fast-access memory.

Meeting language model service 832 may comprise program code executed by processing unit 810 to cause system 800 to generate meeting language models 834 associated with various meetings as described herein. Such generation may be based on e-mail data n-gram models 836 and meeting data n-gram models 838 as described above. E-mail data n-gram models 836 and meeting data n-gram models 838 may be generated by an n-gram service based on e-mail data and meeting data as described above. Data storage device 830 may also store data and other program code for providing additional functionality and/or which are necessary for operation of system 800, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Embodiments are not limited to the examples described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a memory storing processor-executable process steps;
   a processing unit to execute the processor-executable process steps to cause the system to:
   acquire meeting data associated with a meeting;
   acquire e-mail data associated with each of a plurality of meeting participants associated with the meeting;
   generate a meeting language model from the acquired e-mail data and the meeting data;
   generate an adapted meeting language model based on the meeting language model and a generic language model; and
   provide the adapted meeting language model to a transcription service to transcribe audio associated with the meeting using the adapted meeting language model.

2. A system according to claim 1, wherein acquisition of meeting data associated with the meeting comprises determination of a meeting data n-gram model based on meeting data associated with the meeting, and
   wherein acquisition of e-mail data associated with each of the plurality of meeting participants comprises determination of a meeting participant n-gram model for each of the plurality of meeting participants based on e-mail data associated with each of the plurality of meeting participants.

3. A system according to claim 2, wherein generation of a meeting language model comprises generation of a meeting n-gram model based on the meeting data n-gram model and the meeting participant n-gram models, and generation of the meeting language model based on the meeting n-gram model.

4. A system according to claim 1, the processing unit to further execute the processor-executable process steps to cause the system to:
   detect that a start time of the meeting is within a threshold time from a current time; and
   in response to the detection, transmit a request to generate a meeting language model associated with the meeting,
   wherein acquisition of the meeting data, acquisition of the e-mail data, and generation of the meeting language model are in response to reception of the request.

5. A system according to claim 4, wherein acquisition of meeting data associated with the meeting comprises determination of a meeting data n-gram model based on meeting data associated with the meeting,
   wherein acquisition of e-mail data associated with each of the plurality of meeting participants comprises determination of a meeting participant n-gram model for each of the plurality of meeting participants based on e-mail data associated with each of the plurality of meeting participants, and
   wherein generation of a meeting language model comprises generation of a meeting n-gram model based on the meeting data n-gram model and the meeting participant n-gram models, and generation of the meeting language model based on the meeting n-gram model.

6. A computer-implemented method comprising:
   acquiring meeting data associated with a meeting;
   determining a plurality of meeting participants based on the acquired meeting data;
   acquiring e-mail data associated with each of the plurality of meeting participants;
   generating a meeting language model from the acquired e-mail data and the meeting data;
   generating an adapted meeting language model based on the meeting language model and a generic language model; and
   transcribing audio associated with the meeting using the adapted meeting language model.

7. A computer-implemented method according to claim 6, wherein acquiring meeting data associated with the meeting comprises determining a meeting data n-gram model based on meeting data associated with the meeting, and
   wherein acquiring e-mail data associated with each of the plurality of meeting participants comprises determining a meeting participant n-gram model for each of the plurality of meeting participants based on e-mail data associated with each of the plurality of meeting participants.

8. A computer-implemented method according to claim 7, wherein generating a meeting language model comprises generating a meeting n-gram model based on the meeting data n-gram model and the meeting participant n-gram models, and generating the meeting language model based on the meeting n-gram model.

9. A computer-implemented method according to claim 6, further comprising:
   detecting that a start time of the meeting is within a threshold time from a current time; and
   in response to the detection, transmitting a request to generate a meeting language model associated with the meeting,
   wherein acquisition of the meeting data associated with the meeting is in response to reception of the request.

10. A computer-implemented method according to claim 9, wherein acquiring meeting data associated with the meeting comprises determining a meeting data n-gram model based on meeting data associated with the meeting,
  wherein acquiring e-mail data associated with each of the plurality of meeting participants comprises determining a meeting participant n-gram model for each of the plurality of meeting participants based on e-mail data associated with each of the plurality of meeting participants, and
  wherein generating a meeting language model comprises generating a meeting n-gram model based on the meeting data n-gram model and the meeting participant n-gram models, and generating the meeting language model based on the meeting n-gram model.

11. A system comprising:
a meeting language model service to:
receive a request for a meeting language model associated with a meeting;
acquire meeting data associated with the meeting;
determine a plurality of meeting participants associated with the meeting based on the meeting data;
acquire e-mail data associated with each of the plurality of meeting participants associated with the meeting; and
generate a meeting language model from the acquired e-mail data and the meeting data;
generate an adapted meeting language model based on the meeting language model and a generic language model; and
a transcription service to transcribe audio associated with the meeting using the adapted meeting language model.

12. A system according to claim 11, wherein the acquired meeting data associated with the meeting comprises a meeting data n-gram model,
  wherein the acquired e-mail data associated with each of the plurality of meeting participants comprises a meeting participant n-gram model for each of the plurality of meeting participants, and further comprising:
  an n-gram service to generate the meeting data n-gram model and the plurality of meeting participant n-gram models.

13. A system according to claim 12, wherein generation of the meeting language model comprises generation of a meeting n-gram model based on the meeting data n-gram model and the meeting participant n-gram models, and generation of the meeting language model based on the meeting n-gram model.

14. A system according to claim 11, further comprising:
  a meeting model trigger service to detect that a start time of the meeting is within a threshold time from a current time; and
  in response to the detection, transmit a request to the meeting language model service to generate a meeting language model associated with the meeting.

15. A system according to claim 14, wherein the acquired meeting data associated with the meeting comprises a meeting data n-gram model,
  wherein the acquired e-mail data associated with each of the plurality of meeting participants comprises a meeting participant n-gram model for each of the plurality of meeting participants, and further comprising:
  an n-gram service to generate the meeting data n-gram model and the plurality of meeting participant n-gram models,
  wherein generation of the meeting language model comprises generation of a meeting n-gram model based on the meeting data n-gram model and the meeting participant n-gram models, and generation of the meeting language model based on the meeting n-gram model.

* * * * *